Patented Jan. 17, 1939

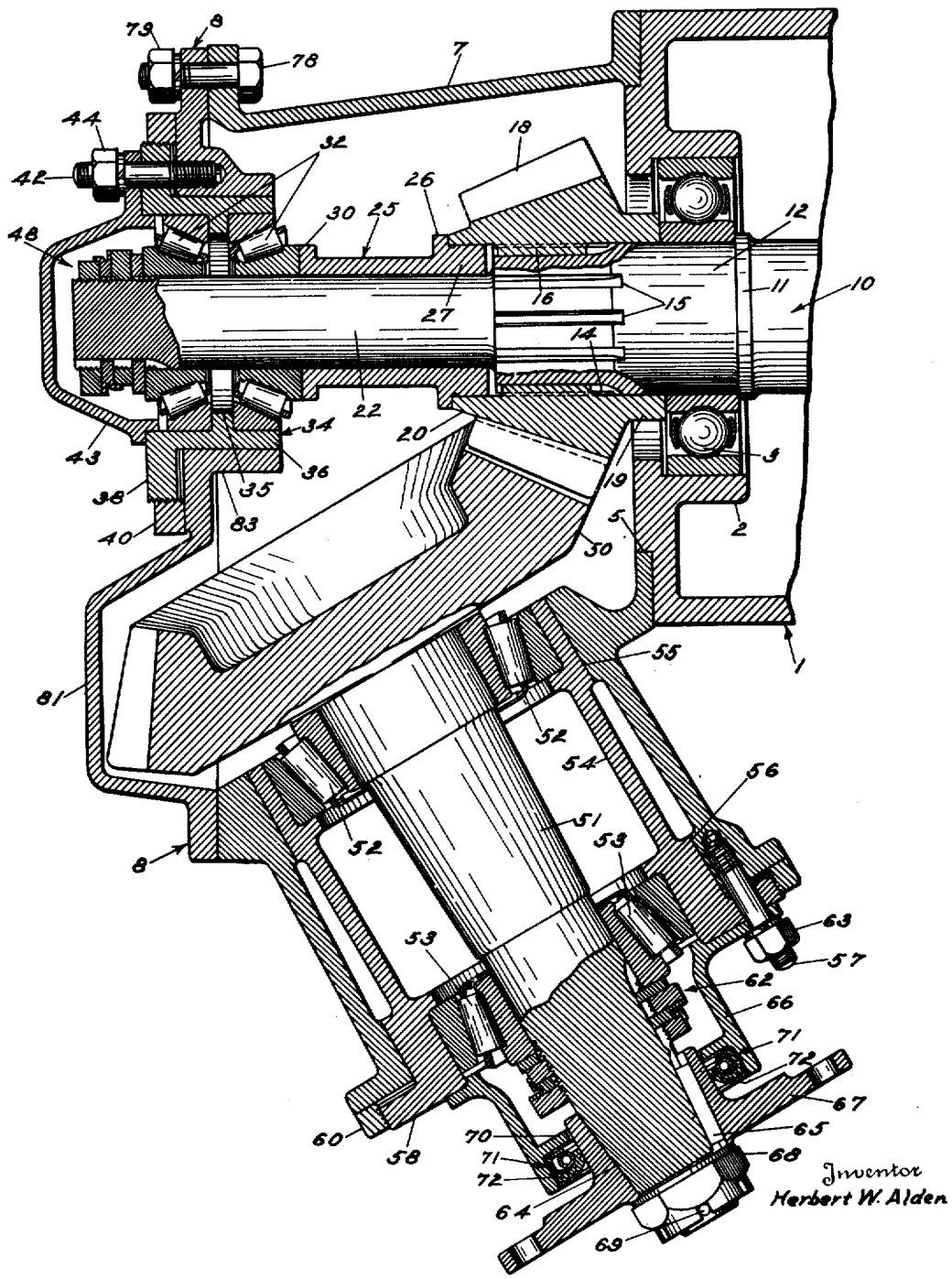

2,143,968

UNITED STATES PATENT OFFICE 2,143,968

POWER TRANSMITTING DEVICE

Herbert W. Alden, Detroit, Mich., assignor to The Timken-Detroit Axle Company, Detroit, Mich., a corporation of Ohio Application March 31, 1934, Serial No. 718,475

13 Claims. (Cl. 74—424)

The present invention relates to power transmitting devices and is concerned more particularly with a novel arrangement for transmitting power from a driving to a driven shaft in a vehicle drive.

In one type of drive as used in the Austin vehicle, the engine, clutch and transmission are placed laterally of the vehicle and driving power is transmitted from the transmission to the drive axle by means of a propeller shaft which is angularly disposed with respect to the longitudinal axis of the vehicle. The present invention is especially concerned with improvements in this type of drive arrangement.

The invention also relates to a novel means for adapting a transmission device of the conventional type to a vehicle drive of the character referred to above.

The primary object of the present invention is to provide a novel driving connection between angularly placed shafts in which the parts comprising the driving connection are maintained in correct operative relationship with respect to each other and in which novel means are provided to effect adjustments necessary to maintain quiet and efficient operation of the drive.

Another object of the present invention is to provide in a vehicle drive, a novel power transmitting unit between the end of the transmission tail shaft and an angularly located vehicle propeller shaft, the said unit being readily adaptable to any transmission. In this connection it is an object of the present invention to provide a novel casing which readily adapts the drive for use with any form of transmission.

A still further object of the present invention is to provide a novel bevel gear mounting which supports the gear on both sides of the point of maximum driving pressure on the gear teeth and imparts driving power to the gear between the supports.

A further object of this invention is to provide a driving bevel gear for an angular transmission drive take-off that may be removably secured to the transmission tail shaft in such a manner that it is adequately supported and driven.

In drives of the type with which this invention is especially concerned, it is necessary to provide a means for adjusting the meshing engagement, of the gears which comprise the drive, to insure continued quietness of operation. Also, an adjusting means is provided for the bearings supporting the shafts on which the gears are mounted to compensate for manufacturing variations in the bearing supports and to facilitate assembly of the parts.

The operation of adjusting the meshing engagement of the bevel gears is one which requires care, but may be readily accomplished by a person possessing the necessary skill. In the power transmitting device of the present invention it is not necessary to disassemble the drive or disturb the relationship of the parts to adjust the gears.

Adjustment of the shaft bearings is seldom if ever necessary, but when it is to be done only a skilled worker should be entrusted with the task as it is possible to disarrange the mechanism seriously if the bearings are carelessly adjusted or if the adjusting means is tampered with by an unauthorized person. In accordance with the present invention it is contemplated to reduce the possibility of tampering by providing access to the bearing adjustment means only after partial disassembly of the parts comprising the drive mechanism.

A further major object of the present invention is to devise, in a power transmitting unit, a gear adjustment that can be made without even partially disassembling the operating parts, and particularly without disturbing any previously made bearing adjustments.

A still further object of the present invention is to provide novel means for adjusting the meshing engagement of a pair of bevel gears.

It is still another object of the present invention to provide means for adjustment of the bearings of the drive gear shafts in a power transmission mechanism which means are accessible only after partial disassembly of the mechanism.

A still further object of the present invention is to provide novel locking means for preserving the adjustment of the meshing engagement of the gears.

A further object of this invention is to provide an angular transmission drive take-off that is easily assembled and serviced.

The accomplishment of the above and other objects of the invention will appear from the following description, and from the accompanying drawing.

The illustrated view represents a horizontal section taken along the plane of the transmission tail shaft and the propeller shaft.

Referring to the drawing, numeral 1 indicates the transmission casing, which, in the interest of clarity, has been shown only in part. Said casing 1 has an internal cylindrical nosing 2 forming a carrier for a bearing 3. The end surface of casing 1 has a stepped annular shoulder 5 which is adapted to receive and locate an angular drive take-off housing 7, which includes and is partially closed by a cover plate 8.

It may be noted here that if the end surface of the transmission casing is not particularly adapted to fit the housing 7, all that will be required is an adapter made specially to receive both casing and housing, or, depending upon production and the relative cost of housing 7 and casing 1, either one or the other may be revised.

The transmission tail shaft 10 has a portion 12 which is journaled in the bearing 3, and the shaft has a locating shoulder 11 which abuts one side of said bearing. Due to the manner of mounting bearing 3, shaft 10 has considerable freedom of axial movement with respect to casing 1, as far as bearing 3 is concerned. The outer end of the portion is slightly reduced as at 14 and provided with longitudinal splines 15. Meshing with said splines 15 are splines 16 of a bevel gear 18 which has a collar portion 19 close-fitted to the unreduced portion 12 of the shaft 10 and in abutment with the bearing 3. Opposite to collar 19 of the gear 18 is a second collar 20, the inside diameter of which is substantially the same as the inside diameter of collar 19 and in any case both of said diameters are greater than the outside diameter of spline 15, or the root diameter of spline 16.

Immediately adjacent the gear 18 and riding on a reduced integral extension 22 of shaft 10 is a sleeve 25 which has a shoulder 26 in abutment with collar 20 of gear 18, and a cylindrical portion 27 which enters and pilots the collar 20. The end of the portion 27, which is adjacent the spline portion 15 of shaft 10, does not abut said spline portion. This insures that the gear 18 may be clamped firmly between collar 26 and the inner race of bearing 3. It will also be noted that gear 18 is concentrically and adequately piloted on both sides of the center of the teeth where the maximum pressure is applied. Further, the splines, which are the torque-transmitting medium, are directly under this center of pressure.

Sleeve 25 has a shoulder 30 which abuts the inner race of one of a pair of bearing assemblies 32, the inner races of which are carried on the shaft extension 22 and the outer races of which are carried in a bearing assembly cage 34 that is supported by the cover plate 8. Cage 34 comprises an integral bearing spacing ring 35 on its inner surface; a cylindrical portion 36 immediately surrounding the bearings; and an outwardly turned annular end flange 38 which is substantially at right angles to said cylindrical portion 36. The outside diameter of said flange 38 is threaded to receive an internally threaded adjusting ring 40. Flange 38 is also suitably apertured to receive studs 42 carried by the cover plate 8 which extend through like apertures in an end cap 43 and onto which are threaded nuts 44 which clamp the cap 43 and the cage 34 in place, at the same time jamming or locking the complemental threads of the flange 38 and the adjusting ring 40.

Shaft 10 is suitably threaded at its outer end to receive a suitable locking arrangement 48 which serves as an adjusting means for the combined radial and thrust bearings 32. When these bearings are properly adjusted, the gear 18 and the sleeve 25 are retained in assembled relationship on the shaft 10 between the inner races of the bearing 3 and the inner bearing assembly 32.

Meshing with bevel gear 18 is a second bevel gear 50. It is understood that the size of the respective gears will vary with the angle of power take-off desired, as well as the ratio of speed reduction. In the form shown the angle of power take-off is approximately sixty degrees and the speed of the gear 50 is materially less than that of gear 18.

The mounting of gear 50 is very similar to the conventional mounting of a pinion in a bevel gear automotive axle. The shank 51 of gear 50 is supported in bearings 52 and 53 which are in turn supported and spaced in a cage 54, which is in turn suitably supported in an angularly offset portion of the housing 7 as at 55 and 56. Cage 54 has an outwardly turned flange 58 which is externally threaded for cooperation with the internal threads of an adjusting ring 60 and suitably apertured to receive studs 57 which extend through like apertures in a cap 66 and onto which are threaded nuts 63 which clamp the cap 66 and the cage 54 in place, at the same time jamming the threaded contact between the flange 58 and the adjusting ring 60, the design being similar to that described in connection with the mounting for cage 34. A suitable locking assembly 62, which is similar to the locking assembly 48, is provided on the threaded portion 30 of shank 51 adjacent bearing assembly 53. At the outer end of shank 51 and adjacent the threaded portion is a tapered portion 64 which is suitable slotted to receive a key 65, which in turn is inserted into a like slot in a companion flange 67 which may be of any desired design to take any selected universal joint. Companion flange 67 is tightly held in place on tapered portion 64 by means of a nut 68, which is held from rotating by means of cotter pin 69. Cover 66 is provided at its outermost portion with an internal annular flange or shoulder 70 against which is pressed an oil seal assembly 71. The sealing portion of said oil seal—in the present invention, the leather 72—rides on the hub of the companion flange 67. The cover plate 8 is removably secured to the housing 7 by means of bolts 78 and nuts 79. The cover has a pocket formation 81 for clearance over bevel gear 50 and an inturned cylindrical portion 83, the inner surface of which is adapted to pilot the cage 34. In order to insure the inside diameter of the cylindrical portion 83 being concentric with the tail shaft 10, the cover plate 8, during manufacture, is doweled to housing 7, which is in turn located on the concentric pilot shoulder 5 of the transmission casing 1 or a suitable locating fixture, and the machining of said cylindrical portion is then performed.

The ease of assembly is apparent. All that is required of the standard transmission is that its tail shaft conform to certain requirements, that is, be mounted so as to have some freedom of axial movement, and the end facing of the transmission casing likewise be adaptable. Then bevel gear 18 is placed on tail shaft 10 in register with splines 15 and in abutment with bearing 3. Sleeve 25 and the inner race of the inner bearing 32 are next assembled on the shaft. The remaining parts, with the exception of the inner race of outer bearing 32, locking assembly 48 and cap 43 are adapted to be assembled separately into what is known as a bench assembly. Then the entire unit, with the exceptions noted, is assembled and fixed in place by suitably clamping the housing 7 to the transmission casing 1. The inner race of outer bearing 32 is next placed in position and retained by locking assembly 48 which also holds the parts mounted on shaft 10 in their relative positions.

Cap 43 is next assembled and the meshing of the gears is then adjusted by means of adjusting rings 49 and 60. When the proper adjustment is reached the entire assembly is locked in place by means of nuts 44 and 63. The thrust bearings on either tail shaft 10 or shank 51 are adjusted by means of locking assemblies 48 and 62 respectively. When the proper adjustment is reached, the means by which the adjustments were made are covered by the closure members 43 and 66. It is seldom, if ever, during the life of the mechanism that the bearing adjustment will have to be changed. Therefore, having the adjusting means enclosed safe-guards against their being tampered with by inexperienced hands.

The means by which the accuracy of the meshing engagement of the gears is adjusted is wholly on the exterior, and thus easily available. The advantage of this arrangement is that during adjustment it is not necessary to dis-assemble the unit either totally or in part thereof in order to obtain the correct adjustment. In particular it should be noted that this mesh adjustment is made without disturbing the original bearing adjustment. A meshing adjustment operation is very delicate and if dis-assembly were required the parts would have to be changed in relation to each other when built up again after adjustment so that added error would be involved. In the present form, this error cannot occur and it has a further advantage in that the time of dis-assembly and assembly is saved. These external gear adjustments are of such nature that an unskilled person would hardly recognize them as adjustments, and in any event the advantages of having the gear adjustments on the outside greatly exceed the disadvantages which might arise from tampering by inexperienced hands.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting device comprising a shaft having a gear secured thereon, a driving shaft, a gear on said driving shaft in mesh with said first named gear, and a casing for said device, a bearing housing and a bearing for said driving shaft received in an aperture in said casing, a sleeve in threaded engagement with an externally threaded portion of said housing, said sleeve abutting the external face of said casing, whereby the housing is permitted to assume various positions longitudinally of said aperture upon turning of said sleeve thereby axially to move said shaft and gear, means to adjust said bearing, a cover member for said adjusting means, and means securing said cover member to said housing and at the same time locking said ring against turning on said housing.

2. In a power transmitting device, a shaft, a gear on said shaft, a sleeve received on said shaft and supporting one end of said gear, said gear being supported on an enlarged portion of said shaft at its other end, and means connecting said shaft and said gear to rotate together, said means lying between said sleeve and said enlarged shaft portion.

3. In a power transmitting device, a shaft having an enlarged portion and a reduced portion, a hollow gear, the enlarged portion of said shaft extending partially within said gear to carry said gear at one end thereof, means fitted onto said reduced portion and extending partially within said gear and spaced from said enlarged shaft portion to support said gear at its other end, and means connecting said shaft and gear to rotate together, said means lying between said fitted means and said enlarged shaft portion.

4. The combination of claim 3 wherein said connecting means comprises complemental splines in said bore and on said shaft.

5. In a power transmitting device, a shaft having an enlarged portion and a reduced portion, a gear having an axial bore, the enlarged portion of said shaft extending partially within said bore to carry said gear at one end thereof, means fitted onto said reduced portion and extending partially within said bore and spaced from said enlarged shaft portion to support said gear at its other end, and complemental splines in said bore and on said shaft, the splines on said shaft being of less diameter than said fitted means and said enlarged shaft portion.

6. In a power transmitting device, a housing assembly; a shaft; an abutment provided on said shaft; a bearing member on said shaft contacting said abutment and carried by said housing assembly; a gear-toothed member slidable longitudinally of said shaft into abutment at one end with said bearing member and in driving connection with the shaft; means, including a thrust bearing carried by said housing assembly, in engagement with the other end of said gear-toothed member and surrounding said shaft; a second abutment provided on said shaft in engagement with said means; one of said abutments being adjustable longitudinally of the shaft to slide said bearings and said gear-toothed member axially relative to the shaft to obtain proper contacts and running clearance; and means carried by said housing assembly for bodily adjusting said shaft, said bearings and said gear-toothed member axially as a unit to properly position said gear-toothed member.

7. The combination of claim 6 wherein a second shaft is carried by said housing assembly in angular relationship with said first named shaft; a gear-toothed member on said second shaft in mesh with said first named gear-toothed member; and means for moving said second named shaft and gear axially whereby the meshing engagement of said gears may be very accurately adjusted by moving said shafts axially.

8. In a power transmitting device, a shaft, a shoulder provided on said shaft and a bearing member on said shaft abutting said shoulder, a gear comprising a hub having a cylindrical bore of a diameter substantially equal to the diameter of said shaft adjacent said shoulder and a radially extending toothed portion of less width longitudinally than said hub, spline teeth on said gear extending into said bore opposite said toothed portion, said shaft comprising a section slightly reduced in diameter and provided with spline grooves for cooperation with the spline teeth on said gear, a shaft section extending beyond and of less diameter than said splined section, a hollow sleeve having an external shoulder received on said last named shaft section, said sleeve being received at one end in said bore with said external shoulder abutting the end of said hub, a combined radial and thrust antifriction bearing on said last named shaft section abutting said sleeve, and means to adjust said bearing, said bearing adjusting means retaining said gear and said sleeve in assembled relationship on said shaft.

9. In a power transmitting device comprising a shaft having a gear secured thereon and a casing, a bearing carrier in the form of a housing, antifriction radial and thrust bearings within said housing rotatably supporting said shaft, said carrier received in an aperture in said casing, means for threaded cooperation with said carrier and for abutting cooperation with the external face of said casing surrounding said aperture, and an elongated element holding said carrier against rotation while permitting axial movement thereof, whereby upon turning of said means, the carrier assumes various positions longitudinally of said aperture thereby axially to move said shaft and gear, and means mounted on a portion of said shaft extending outwardly from said aperture to adjust said bearings and a cover member fitted over said adjusting means and to said carrier and held in position by said elongated element.

10. In a drive mechanism, a housing, a shaft having a gear rotatably supported in said housing, a drive shaft projecting into said housing, a bearing member surrounding said shaft and being restrained from axial movement thereon, a gear formation in mesh with said first named gear rotatably secured to said drive shaft and abutting said bearing member, a carrier assembly including a thrust bearing carried by said housing and a sleeve formation extending from said thrust bearing to that side of said gear formation which is opposite said bearing member, a second abutment on said drive shaft adjustable to fixed positions longitudinally thereof, said second abutment bearing in engagement with said carrier assembly and hence effective through said sleeve formation to hold said gear formation in assembled position axially of said shaft, and means cooperating with said housing for bodily adjusting said shaft, said bearings and said gear formation axially as a unit.

11. In a power transmitting device comprising a pair of angularly placed shafts, intermeshing gears on said shafts, a casing for said device, bearing housings mounted in said casing and enclosing anti-friction bearings rotatably supporting each of said shafts, means associated with each of said shafts for adjusting the anti-friction bearing which supports said shaft, readily removable cover members secured to said bearing housings and enclosing said adjusting means, and means associated with each of said housings, exteriorly of said cover members, for axially moving said housings for adjusting said intermeshing gears.

12. In a power transmitting device, a casing, a pair of angularly related shafts, bearings for supporting said shafts in said casing, intermeshing gears mounted on said shafts, bearing carriers, certain of said bearings being of the antifriction type and mounted in said carriers, said carriers being supported by said casing, readily accessible abutment means threaded to each of said carriers and abutting against surfaces on said casing to determine the relative position of each of said carriers with respect to said casing, means passing through each of said carriers and associated with said casing for holding said abutment means against said surface of said casing, said abutment means being movable along said carriers, by turning, to effect movement of said carriers with respect to said casing and thereby to axially shift said shafts and gears, whereby the meshing engagement of said gears may be adjusted.

13. In a power transmitting device comprising a shaft having a gear secured thereon, a driving shaft, a gear on said driving shaft in mesh with said first named gear and a casing for said device, a bearing housing and bearing for said driving shaft received in an aperture in said casing, an abutment face on said casing, a flange on said housing, spacing means associated with said flange and abutting said abutment face for selectively positioning said bearing housing and said bearing longitudinally in said aperture, to axially move said driving shaft and gear, means to adjust said bearing, a cover member for said adjusting means, and means securing said cover member to said housing and at the same time holding said spacing means against said abutment face.

HERBERT W. ALDEN.

CERTIFICATE OF CORRECTION.

Patent No. 2,143,968. January 17, 1939.

HERBERT W. ALDEN.

It is hereby certified that error appears in the printed specification of the above numbered patent requiring correction as follows: Page 4, first column, line 47, claim 10, for the word "bearing" read being; and second column, line 28, claim 12, for "surface" read surfaces; and that the said Letters Patent should be read with this correction therein that the same may conform to the record of the case in the Patent Office.

Signed and sealed this 21st day of February, A. D. 1939.

Henry Van Arsdale.

(Seal) Acting Commissioner of Patents.

teeth on said gear, a shaft section extending beyond and of less diameter than said splined section, a hollow sleeve having an external shoulder received on said last named shaft section, said sleeve being received at one end in said bore with said external shoulder abutting the end of said hub, a combined radial and thrust antifriction bearing on said last named shaft section abutting said sleeve, and means to adjust said bearing, said bearing adjusting means retaining said gear and said sleeve in assembled relationship on said shaft.

9. In a power transmitting device comprising a shaft having a gear secured thereon and a casing, a bearing carrier in the form of a housing, antifriction radial and thrust bearings within said housing rotatably supporting said shaft, said carrier received in an aperture in said casing, means for threaded cooperation with said carrier and for abutting cooperation with the external face of said casing surrounding said aperture, and an elongated element holding said carrier against rotation while permitting axial movement thereof, whereby upon turning of said means, the carrier assumes various positions longitudinally of said aperture thereby axially to move said shaft and gear, and means mounted on a portion of said shaft extending outwardly from said aperture to adjust said bearings and a cover member fitted over said adjusting means and to said carrier and held in position by said elongated element.

10. In a drive mechanism, a housing, a shaft having a gear rotatably supported in said housing, a drive shaft projecting into said housing, a bearing member surrounding said shaft and being restrained from axial movement thereon, a gear formation in mesh with said first named gear rotatably secured to said drive shaft and abutting said bearing member, a carrier assembly including a thrust bearing carried by said housing and a sleeve formation extending from said thrust bearing to that side of said gear formation which is opposite said bearing member, a second abutment on said drive shaft adjustable to fixed positions longitudinally thereof, said second abutment bearing in engagement with said carrier assembly and hence effective through said sleeve formation to hold said gear formation in assembled position axially of said shaft, and means cooperating with said housing for bodily adjusting said shaft, said bearings and said gear formation axially as a unit.

11. In a power transmitting device comprising a pair of angularly placed shafts, intermeshing gears on said shafts, a casing for said device, bearing housings mounted in said casing and enclosing anti-friction bearings rotatably supporting each of said shafts, means associated with each of said shafts for adjusting the anti-friction bearing which supports said shaft, readily removable cover members secured to said bearing housings and enclosing said adjusting means, and means associated with each of said housings, exteriorly of said cover members, for axially moving said housings for adjusting said intermeshing gears.

12. In a power transmitting device, a casing, a pair of angularly related shafts, bearings for supporting said shafts in said casing, intermeshing gears mounted on said shafts, bearing carriers, certain of said bearings being of the antifriction type and mounted in said carriers, said carriers being supported by said casing, readily accessible abutment means threaded to each of said carriers and abutting against surfaces on said casing to determine the relative position of each of said carriers with respect to said casing, means passing through each of said carriers and associated with said casing for holding said abutment means against said surface of said casing, said abutment means being movable along said carriers, by turning, to effect movement of said carriers with respect to said casing and thereby to axially shift said shafts and gears, whereby the meshing engagement of said gears may be adjusted.

13. In a power transmitting device comprising a shaft having a gear secured thereon, a driving shaft, a gear on said driving shaft in mesh with said first named gear and a casing for said device, a bearing housing and bearing for said driving shaft received in an aperture in said casing, an abutment face on said casing, a flange on said housing, spacing means associated with said flange and abutting said abutment face for selectively positioning said bearing housing and said bearing longitudinally in said aperture, to axially move said driving shaft and gear, means to adjust said bearing, a cover member for said adjusting means, and means securing said cover member to said housing and at the same time holding said spacing means against said abutment face.

HERBERT W. ALDEN.

CERTIFICATE OF CORRECTION.

Patent No. 2,143,968. January 17, 1939.

HERBERT W. ALDEN.

It is hereby certified that error appears in the printed specification of the above numbered patent requiring correction as follows: Page 4, first column, line 47, claim 10, for the word "bearing" read being; and second column, line 28, claim 12, for "surface" read surfaces; and that the said Letters Patent should be read with this correction therein that the same may conform to the record of the case in the Patent Office.

Signed and sealed this 21st day of February, A. D. 1939.

(Seal)

Henry Van Arsdale.

Acting Commissioner of Patents.